G. B. BRETZ.
NOODLE CUTTER.
APPLICATION FILED MAR. 30, 1910.
961,337.
Patented June 14, 1910.
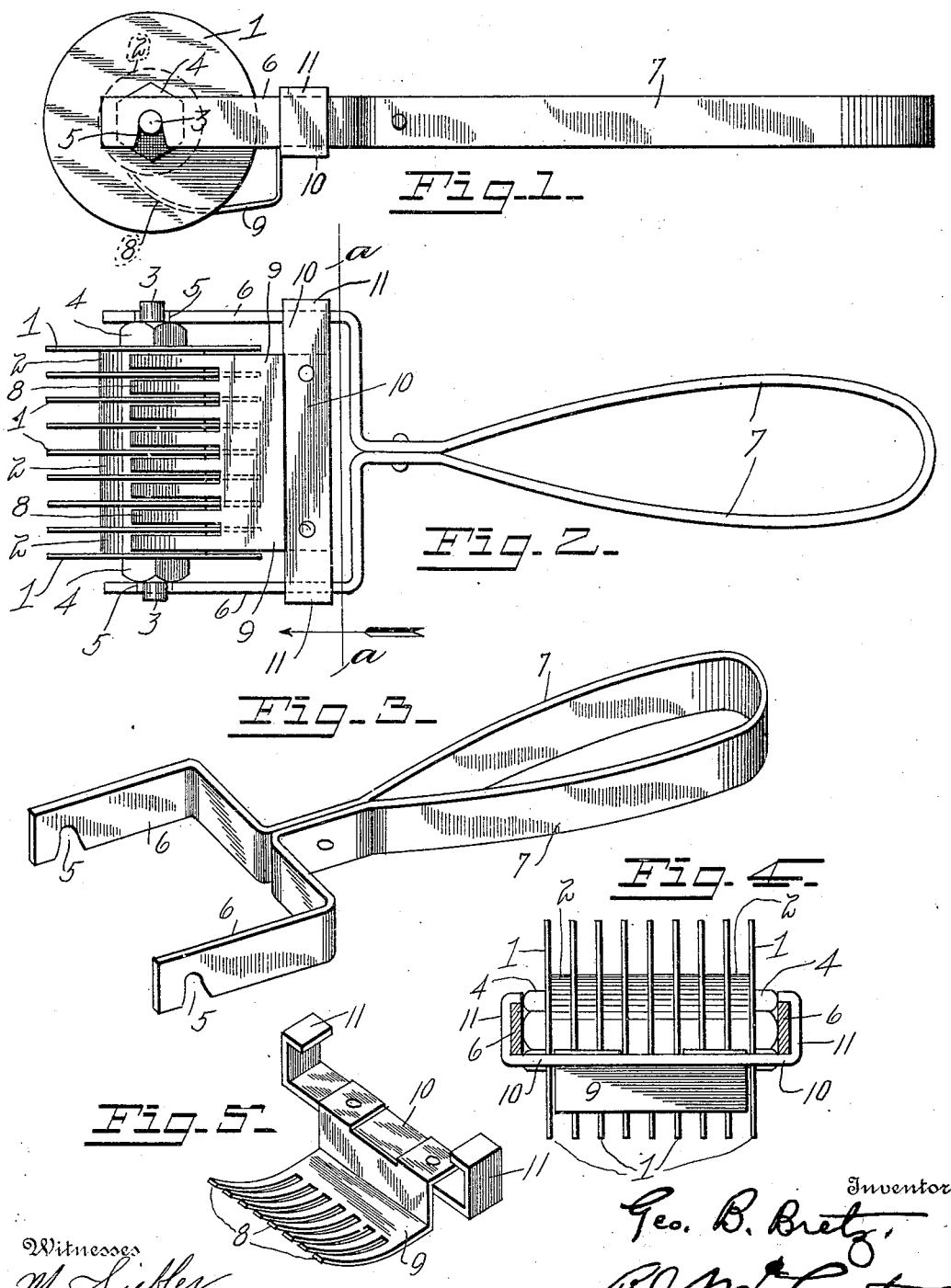

UNITED STATES PATENT OFFICE.

GEORGE B. BRETZ, OF DAYTON, OHIO, ASSIGNOR TO W. S. JUDY, OF DAYTON, OHIO.

NOODLE-CUTTER.

961,337.  Specification of Letters Patent. Patented June 14, 1910.

Application filed March 30, 1910. Serial No. 552,356.

*To all whom it may concern:*

Be it known that I, GEORGE B. BRETZ, a citizen of the United States, residing at Dayton, in the county of Montgomery and State of Ohio, have invented certain new and useful Improvements in Noodle-Cutters; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in dough cutters for cutting dough into thin narrow strips from which noodles are subsequently made. The device may, for the sake of brevity, be termed a noodle cutter. In the use thereof, the dough to be operated on by the cutter is rolled into a thin sheet, and the cutter or implement is moved over the sheet of dough successively, in parallel lines, cutting the same into long narrow strips.

The object of the invention is to provide a noodle cutter which may be repeatedly operated without any of the parts becoming loose or detached, to this end the framework of the implement, including the handle, is made in the fewest number of parts.

A further object of the invention is to provide for readily taking the device apart for cleansing purposes, as sanitary as well as working conditions require that the device be kept free from accumulations of dough, and clogging of the cutters, and a still further object of the invention is to provide for the ready reassembling of the parts after taking them apart; this work is expedited by making the frame work and handle portion in a single member, and providing for the ready attachment of the dough guard to the parallel frame members which are integral extensions of the handle.

Other features of advantage will be referred to in the following description of the device, which will be read in the light of the accompanying drawings, of which—

Figure 1 is a side elevation of my improved noodle cutter. Fig. 2 is a bottom plan view of the same. Fig. 3 is a detached perspective view of the combined frame and handle portions of the device. Fig. 4 is a sectional view on the line *a—a* of Fig. 2. Fig. 5 is a detached perspective view of the combined cutter retainer and dough guard or stripper.

Referring in detail to the drawings, 1 designates a series of thin metal disks of uniform diameters and constituting cutters of circular form. When assembled they are uniformly spaced apart by spacing washers 2. The disks and spacing washers are mounted upon a shaft 3 and rigidly secured thereon by two end nuts 4. The ends of the shaft extend a suitable distance beyond the nuts and have bearings in the side members 6—6 of the frame. In the lower edges of the said side frames notches 5—5 are cut for the reception of the ends of the shaft 3.

In practice it has been found that the shaft with the assembled cutters is more securely supported in its bearings by this manner of placing the notches 5—5, and the removal of the shaft and cutters is equally facilitated. The side frames 6—6 are forwardly extended portions of the handle, the whole being constructed of a single bar of metal of requisite strength and size, which is bent upon itself to form the grip portions 7—7, and brought together and united at a point between the handle and the cutter frames. It will be seen that when pressure is exerted downwardly upon the handle, as in operating the cutters, such pressure is instrumental in maintaining the cutter shaft 3 well into the slots 5—5 in the side frames 6—6, and no other means are required for maintaining said shaft in its bearings during the operation of the device. A combined dough stripper and cutter retainer consists of a plate 9 from which extends a series of spring fingers 8 which extend on each side of the cutters or disks 1 and press upwardly against the spacing washers 2. These spring fingers maintain the shaft 3 in its bearings in the slots 5—5 when the implement is not in operation or is being handled, and thus the assembled cutters are prevented at any time from becoming detached from the frame. The plate 9 as well as the fingers also prevent the dough from clinging to the cutters and clogging up the device to an extent that would interfere with its efficiency. The plate 9 is rigidly secured to a cross bar 10, or said parts may be integral. The ends of said cross bar 10 are formed into clamps 11, which fit over the side frames 6—6 by sliding said bar onto the frame from the direction of the handle 7, and when in such position the plate 9 and stripping fingers 8 are held securely in position. The cross bar 10 is also instrumental in preventing any outward springing of the side frames 6—6 that might have a tendency to free them from the ends of the shaft 3. Aside from the assemblage of disks and the shaft upon which they are supported, it will be seen that the device consists of two parts only. In order to disconnect the implement for cleansing, the cross bar 10, together with the fingers 8 and plate 9 are moved rearwardly toward the handle until said bar is detached from the side frames 6—6, the assembled cutters then drop from their bearings and may be removed from the shaft by removing the nuts 4. The parts may be reassembled with the same facility.

I claim:

1. In a device of the character specified, a series of cutter disks assembled upon a shaft and uniformly spaced, side frames having slots extending upwardly from their lower edges and receiving the ends of the cutter shaft, said side frames extending inwardly at the rear of the cutters and terminating in an extended handle portion, and a series of stripping fingers extending between the cutters and detachably supported on the side frames, substantially as specified.

2. In a device of the character specified, a series of cutters assembled upon a shaft, side frames having slots extended upwardly from their lower edges to receive the ends of the cutter shaft, said side frames being joined in the rear of the cutters and terminating in a handle, a series of spring fingers lying between the cutters, said fingers being adapted to strip the dough from the cutters when the implement is in operation, and to maintain the cutter shaft in its bearings when the implement is not in operation, and a cross bar to which said fingers are attached, said cross bar being removably connected to the side frames, substantially as described.

3. In a device of the character specified, a series of cutters assembled upon a shaft, side frames having slots extended upwardly from their lower edges to receive the ends of the cutter shaft, said side frames being joined in the rear of the cutters and terminating in a handle, a series of spring fingers lying between the cutters, said fingers being adapted to strip the dough from the cutters when the implement is in operation, and to maintain the cutter shaft in its bearings when the implement is not in operation, and a cross bar to which said fingers are attached, said cross bar having its ends terminating in clamps which engage the side frames and maintain said fingers in position, substantially as described.

4. In a device of the character specified, a frame consisting of two parallel side bars terminating in a handle and provided with slots extending upwardly from their lower edges, a series of cutters, a shaft upon which said cutters are mounted, said shaft having bearings in the slots in the side bars, and a guard attached to said side bars, said guard having a series of fingers which extend between the cutters, substantially as specified.

In testimony whereof I affix my signature, in presence of two witnesses.

GEORGE B. BRETZ.

Witnesses:
R. J. McCarty,
W. S. Judy.